No. 850,901. PATENTED APR. 23, 1907.
S. BRAMLEY-MOORE.
CHANGE SPEED GEARING.
APPLICATION FILED DEC. 21, 1906.

WITNESSES:
G. V. Symes.
Edward George.

INVENTOR.
S. Bramley-Moore.
Robert Phillips.
Attorney.

UNITED STATES PATENT OFFICE.

SWINFEN BRAMLEY-MOORE, OF BLOOMSBURY, LONDON, ENGLAND.

CHANGE-SPEED GEARING.

No. 850,901.          Specification of Letters Patent.          Patented April 23, 1907.

Original application filed March 30, 1906, Serial No. 308,896. Divided and this application filed December 21, 1906. Serial No. 348,978.

*To all whom it may concern:*

Be it known that I, SWINFEN BRAMLEY-MOORE, a subject of the King of Great Britain and Ireland, residing at 26 Russell Square, Bloomsbury, in the county of London, England, have invented a new and useful Improvement in Change-Speed Gearing, of which the following is a full and complete specification.

This invention relates to an improved change-speed gear particularly adapted for motor road-vehicles of the kind comprising a driving and driven shaft arranged in line, a counter-shaft parallel to said shafts, and trains of gearing connecting said shafts, the object being to obtain a greater number of velocity ratios with the same number of wheels than at present obtains.

Figure 5:
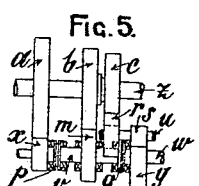
Figure 6:
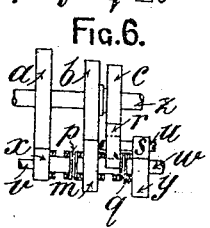
Figure 7:
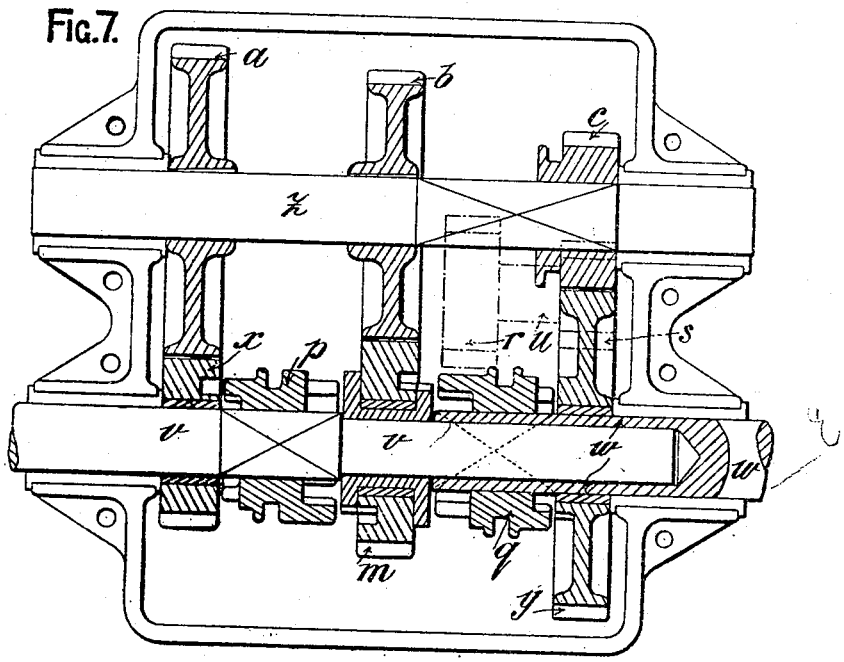

In the accompanying drawings, which illustrate this invention, Figures 1 to 4, inclusive, are diagrammatic views of a gear consisting of six wheels, which gives four different forward speeds. Figs. 5 and 6 are diagrammatic views showing an arrangement for giving the reverse motion at two different speeds. Fig. 7 is a view in plan of a gear constructed according to this invention for motor road-vehicles.

Throughout the views similar parts are marked with like letters of reference.

The driving or engine shaft $v$ and the driven shaft $w$ are arranged in axial alinement, with their abutting ends preferably arranged to mutually support one another by interengagement, as shown. The counter-shaft $z$ is arranged parallel with the driving and driven shafts, and on it are three spur-wheels $a$, $b$, and $c$, spaced at approximately equal distances apart, the two former, $a$ and $b$, being fixed and the latter, $c$, if it is intended to employ a reverse-gear, loosely mounted and free to slide thereon. In permanent gear with the wheel $b$ on the counter-shaft is a wheel $m$, freely mounted on one or other of the axles $v$ or $w$ at their junction, so as to be free to rotate independently of either. A convenient method of doing this is to reduce the end of one axle to form a bearing on which the wheel $m$ can revolve, part of the said reduced end engaging a corresponding recess in the abutting end of the other axle. On the shaft $v$ is a loosely-mounted spur-wheel $x$, adapted to gear with the wheel $a$ on the counter-shaft, and on the shaft $w$ is a loosely-mounted spur-wheel $y$, adapted to gear with the wheel $c$.

Figure 1:
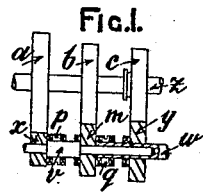
Figure 3:
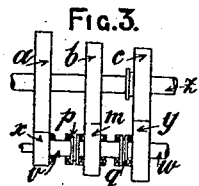
Figure 2:
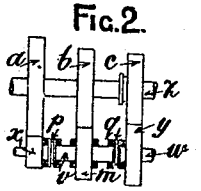
Figure 4:
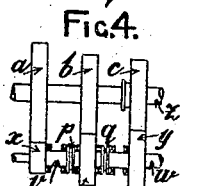

The wheels $x$ and $y$ are provided on one side and the wheel $m$ on both sides with teeth or serrations, with which sliding dog-clutches $p$ and $q$ engage, whereby the wheels $x$ and $y$ can be locked to the respective shafts on which they are mounted, and the wheel $m$ can be locked to either or both of the shafts $v$ and $w$ to produce the various changes of speed. With the clutches $p$ and $q$ both engaging the wheel $m$, as shown in Fig. 4, the two shafts $v$ and $w$ are locked together, and therefore rotate at the same speed, giving what is known as a "direct" drive. With the clutch $p$ engaging the wheel $x$ and the clutch $q$ engaging the wheel $m$, as shown in Fig. 1, the motion of the driving-shaft $v$ is transmitted to the counter-shaft $z$ through the wheels $x$ and $a$ and from the counter-shaft to the driven shaft $w$ through the wheels $b$ and $m$. With the clutch $p$ engaging the wheel $x$ and the clutch $q$ engaging the wheel $y$, as shown in Fig. 2, the motion of the driving-shaft $v$ is transmitted to the counter-shaft through the wheels $x$ and $a$ and from the counter-shaft to the driven shaft $w$ through the wheels $c$ and $y$. With the clutch $p$ engaging the wheel $m$ and the clutch $q$ engaging the wheel $y$, as shown in Fig. 3, the motion of the driving-shaft $v$ is transmitted to the counter-shaft through the wheels $m$ and $b$ and from the counter-shaft to the driven shaft $w$ through the wheels $c$ and $y$, the ratio of the speed being determined on the sizes of the respective wheels.

A suitable reverse-gear consists of a pair of wheels $r$ and $s$, fixed on a second counter-shaft $u$, the wheel $s$ being in permanent gear with the wheel $y$ on the shaft $w$. The wheel $c$ on the counter-shaft is then arranged to slide thereon so as to enable it to be brought into gear with the wheel $r$. The two reverse speeds are then obtained by bringing the clutch $q$ into engagement with the wheel $y$ and the clutch $p$ into engagement with one or other of the wheels $x$ and $m$, as shown in Figs. 5 and 6.

It will be seen that in producing the direct drive from the shaft $v$ to the shaft $w$ the counter-shaft $z$ is rotating idly on account of the wheel $m$ being permanently in gear with the wheel $b$. To avoid this and have no wheels or axles in motion on the direct drive other than the driving and driven axles, the wheel m instead of being mounted directly on one of the axles is mounted loosely on a sleeve o, which is mounted loosely on one of the axles, as shown in Fig. 7, both the wheel m and the sleeve o being formed with teeth or serrations, so that the clutches p and q can engage either the sleeve o and to connect the shafts v and w together to produce the direct drive or both the sleeve o and the wheel m to produce the combinations shown by Figs. 1, 2, and 3.

What I claim as my invention, and desire to secure by Letters Patent, is—

1. A change-speed gear comprising a driving and a driven shaft arranged in the same axial line, a counter-shaft parallel with the said driving and driven shafts, a spur-wheel mounted freely at the junction of the driving and driven shafts, a spur-wheel fixed on the counter-shaft with which the aforesaid spur-wheel is in constant mesh, a loosely-mounted spur-wheel on the driving-shaft, a fixed spur-wheel on the counter-shaft with which the spur-wheel on the driving-shaft is constantly in mesh, a loosely-mounted spur-wheel on the driven shaft, a fixed spur-wheel on the counter-shaft with which the spur-wheel on the driven shaft is in constant mesh, means for locking the spur-wheels on the driving and driven shafts respectively to said shafts, and means for locking the spur-wheel mounted at the junction of the driving and driven shafts to either of the said shafts, or to both, as set forth.

2. A change-speed gear comprising a driving and a driven shaft arranged in the same axial line, a counter-shaft parallel with the said driving and driven shafts, a sleeve freely mounted at the junction of the driving and driven shafts, a spur-wheel freely mounted on said sleeve, a spur-wheel fixed on the counter-shaft with which the aforesaid spur-wheel is in constant mesh, a loosely-mounted spur-wheel on the driving-shaft, a fixed spur-wheel on the counter-shaft with which the spur-wheel on the driving-shaft is in constant mesh, a loosely-mounted spur-wheel on the driven shaft, a fixed spur-wheel on the counter-shaft with which the spur-wheel on the driven shaft is in constant mesh, means for locking the spur-wheels on the driving and driven shafts respectively to said shafts, and means for locking the spur-wheel mounted at the junction of the driving and driven shafts to either of the said shafts, or to both, as set forth.

3. A change-speed gear comprising a driving and a driven shaft arranged in the same axial line and having their adjacent ends abutting or interengaging, a spur-wheel mounted freely at the junction of the said shafts, means for positively coupling said spur-wheel to either or both of the said shafts, a spur-wheel loosely mounted on the driving-shaft, a spur-wheel loosely mounted on the driven shaft, means for positively coupling said spur-wheels to their respective shafts, a counter-shaft parallel with the driving and driven shafts, and three spur-wheels fixed on the counter-shaft and in constant mesh with the spur-wheels on the driving and driven shafts, as set forth.

4. A change-speed gear comprising a driving and a driven shaft arranged in the same axial line and having their adjacent ends abutting or interengaging, a sleeve freely mounted at the junction of the said shafts a spur-wheel mounted freely on said sleeve, means for positively connecting said spur-wheel and sleeve to either or both of the said shafts, a spur-wheel loosely mounted on the driving-shaft, a spur-wheel loosely mounted on the driven shaft, means for positively coupling said spur-wheels to their respective shafts, a counter-shaft parallel with the driving and driven shafts, and three spur-wheels fixed on the counter-shaft and in constant mesh with the spur-wheels on the driving and driven shafts, as set forth.

5. A change-speed gear consisting of a driving and a driven shaft in axial alinement, a counter-shaft parallel to said driving and driven shafts, a driving spur-wheel on the driving-shaft, means for coupling said wheel to its shaft, a spur-wheel on the counter-shaft with which the driving spur-wheel on the driving-shaft permanently gears, a spur-wheel on the driven shaft, means for coupling said wheel to its shaft a spur-wheel on the counter-shaft with which the spur-wheel on the driven shaft permanently gears, a second driving spur-wheel freely mounted at the junction of the driving and driven shafts, a spur-wheel on the counter-shaft with which said second driving-wheel permanently gears, and means for locking said wheel to either of the said shafts or to both, whereby said wheel operates to give a second velocity ratio between the driving-shaft and the counter-shaft and enables a direct drive from the driving to the driven shafts to be obtained.

6. In a change-speed gear, the combination with a driving and a driven shaft arranged in axial alinement, of a counter-shaft mounted parallel with the driving and driven shafts, three spur-wheels fixed on said counter-shaft, a free spur-wheel mounted at the junction of the driving and driven shafts and permanently in mesh with one of the wheels on the counter-shaft, two free spur-wheels mounted respectively on the driving and driven shafts, and permanently in mesh with two of the wheels on the counter-shaft, and means for coupling said wheels to their respective shafts so that each can rotate with its shaft, as set forth.

7. In a change-speed gear, the combination with a driving and a driven shaft arranged in axial alinement, of a counter-shaft mounted parallel with the driving and driven shafts, three spur-wheels on said counter-shaft, two of which are fixed and the other free to slide thereon, a free spur-wheel mounted at the junction of the driving and driven shafts and permanently in mesh with one of the fixed wheels on the counter-shaft, a free spur-wheel on the driving-shaft and permanently in mesh with the other fixed wheel on the counter-shaft, a free spur-wheel on the driven shaft which is adapted to gear with the sliding wheel on the counter-shaft, means for coupling the wheels on the driving and driven shafts to their respective shafts so that each can rotate with its shaft, a second counter-shaft, and two spur-pinions fixed thereon one of which is in permanent mesh with the wheel on the driven shaft and the other of which is adapted to gear with the sliding wheel on the counter-shaft, as set forth.

8. In a change-speed gear, the combination of a driving and a driven shaft arranged in axial alinement, a counter-shaft mounted parallel with the driving and driven shafts and three spur-wheels carried thereby, a free spur-wheel mounted at the junction of the driving and driven shafts in permanent mesh with one of the wheels on the counter-shaft, a free spur-wheel on the driving-shaft in permanent mesh with another of the wheels on the counter-shaft, a free spur-wheel on the driven shaft in permanent mesh with the other wheel on the counter-shaft, two sliding clutches mounted respectively on the driving and driven shafts so as to rotate with said shafts and operating to lock either of the free spur-wheels to their respective shafts, or the spur-wheel mounted at the junction of the driving and driven shafts to both said shafts, as set forth.

In testimony whereof I have signed my name in the presence of two subscribing witnesses.

SWINFEN BRAMLEY-MOORE.

Witnesses:
ROBERT E. PHILLIPS,
G. V. LYMES.